US006965933B2

(12) United States Patent
Haartsen

(10) Patent No.: US 6,965,933 B2
(45) Date of Patent: Nov. 15, 2005

(54) METHOD AND APPARATUS FOR TOKEN DISTRIBUTION

(75) Inventor: Jacobus C. Haartsen, Hardenberg (NL)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 763 days.

(21) Appl. No.: 10/114,072

(22) Filed: Apr. 3, 2002

(65) Prior Publication Data

US 2002/0178250 A1 Nov. 28, 2002

Related U.S. Application Data

(60) Provisional application No. 60/292,344, filed on May 22, 2001.

(51) Int. Cl.[7] .......................................... G06F 15/173
(52) U.S. Cl. ..................... 709/223; 709/224; 709/225; 709/226; 370/400; 370/431; 370/450; 370/909
(58) Field of Search ......................... 709/223, 224–226; 370/400, 431, 450, 909

(56) References Cited

U.S. PATENT DOCUMENTS

| 6,044,091 | A | 3/2000 | Kim |
| 6,115,390 | A | 9/2000 | Chuah |
| 6,134,217 | A | 10/2000 | Stiliadis et al. |
| 6,161,138 | A | 12/2000 | Gross et al. |
| 6,480,473 | B1 * | 11/2002 | Chambers et al. .......... 370/253 |
| 6,490,247 | B1 * | 12/2002 | Gilbert et al. .............. 370/222 |
| 6,570,890 | B1 * | 5/2003 | Keenan et al. .............. 370/493 |
| 6,584,089 | B1 * | 6/2003 | Honkasalo et al. ......... 370/338 |
| 6,665,675 | B1 * | 12/2003 | Mitaru ........................ 707/10 |
| 6,751,213 | B1 * | 6/2004 | Sun et al. .................... 370/352 |

FOREIGN PATENT DOCUMENTS

| JP | 06037775 A | 2/1994 |
| JP | 08204743 A | 8/1996 |

OTHER PUBLICATIONS

Popescu, LOGNET: A Low Cost, High Reliability Network for Embedded Systems; Pub Date Jan. 31, 2002, Pertinent Pages: full document.*
I. A.S. Ismael, Bandwidth Problems in High-Speed Networks; IBM J. Res. Develop, vol. 44, No. 6, Nov. 2000, pp. 919-938.

(Continued)

*Primary Examiner*—Zarni Maung
*Assistant Examiner*—Glenford Madamba
(74) *Attorney, Agent, or Firm*—Potomac Patent Group, PLLC

(57) ABSTRACT

A method and apparatus for token distribution include providing one or more nodes of a plurality of network nodes with a token machine that includes counters associated with each of other network nodes having a token machine. Each time a token possessing network node implicitly or explicitly passes the token to another network node having a token machine, counter values of each of the counters associated with each node having a token machine are adjusted. When a token is passed, the counter value of the receiving node is adjusted based, at least in part, on an initial token interval value, and counter values associated with other nodes are adjusted toward a threshold value. The decision as to where the token is passed may be based, at least in part, on the value of a counter and/or an assigned counter priority level. The system or method also may include priority slots in which the token is unconditionally passed to a node assigned the priority slot, and an ARQ scheme for acknowledgment of transferred information.

41 Claims, 6 Drawing Sheets

OTHER PUBLICATIONS

S. Lu et al., "Design and Analysis of an Algorithm for Fair Service in Error-Prone Wireless Channels," Wireless Networks 6 (2000), pp. 323-343.

T.J. Kim et al., "A Waste-Free Fairness Control for Rings With Spatial Reuse," IEICE Trans. Commun., vol. E84-B, No. 2, Feb. 2001, pp. 305-316.

* cited by examiner

METHOD AND APPARATUS FOR TOKEN DISTRIBUTION

RELATED APPLICATIONS

This application claims benefit of priority from U.S. Provisional Application No. 60/292,344, filed on May 22, 2001, the entire disclosure of which is expressly incorporated herein by reference.

BACKGROUND OF THE INVENTION

1. Field of the Invention

The present invention relates to communication networks, and more particularly, to bandwidth allocation in a network with distributed control.

2. Description of the Related Art

Radio Local Area Networks (LAN) typically cover an area of technology where the computer industry and the wireless communications industry merge. Conventional computer networking has relied on wired LANS, typically packet-switched and targeted for data transfer. By contrast, wireless networking, and in particular cellular networking, has relied on wide area networks, typically circuit-switched and targeted for voice transfer. Most efforts in the design of radio LANs have reused the principles that are used in wired LANS. This, however, is a questionable procedure because the environments of the wired medium and of the wireless medium differ in important ways. Moreover, multimedia communications require additional features due to the special traffic characteristics posed by data, voice and video. Finally, the residential environment has its own requirements, which can be decisive for the design of the system.

Almost 100 percent of the computer networks today use a wired infrastructure. The wired medium can range from a simple twisted pair to an optical fiber. Due to its shielded and controllable environment, low interference levels and stable propagation conditions characterize the wired medium. Consequently, the wired medium has potential for high to very high data rates. Because of the latter, all participants in wired LANs typically share this single medium. The medium constitutes a single channel, which is used by only a single one of a number of different users at any given time. Time-division multiplexing (TDM) is used to allow different users to access the channel at different times. The protocols for accessing wired media have been standardized by the IEEE in its 802 series. Typically, multiple access reservation techniques like carrier-sensing (e.g., Ethernet, 802.3 Carrier-Sense Multiple Access/Collision Detect (CSMA/CD) or tokens (e.g., 802.4 token buses, or 802.5 token rings) are used to gain access to the medium. These protocols can be used in a distributed sense in that the user occupying the channel reserves the medium by its present transmission or by its token.

In these schemes, every user can hear all traffic. That is, in a single LAN, all users share not only the channel, but also all of the information carried on that channel. When the number of participants grows, the LAN can be divided into smaller LANs or segments, which channels operate independently. LANs can be interconnected via bridges or routers, which form interfaces between the different local networks. These configurations result in more complex networks. For example, reference is made to D. Bertsekas and R. Callager, Data Networks, 2nd Edition, Prentice-Hall, London, 1992, which is hereby incorporated herein by reference.

For the discussion of the residential LANS, it suffices to consider the single LAN. The LAN typically provides a connectionless packet-switched service. Each packet has a destination address (and usually a source address as well) so that each user can determine whether the packet that passes by is intended for him or not. It will be understood that the net throughput per user in a single LAN is determined by the peak data rate on the channel and by the number of users that share this channel. Even if the peak data rate is very high due to the wide bandwidth of the wireline medium, the effective user throughput can be low if the channel has to be shared among many users.

Since types of communication that take place over current wired LANs are asynchronous and connectionless, current LANs are ill suited for supporting delay-critical services like voice. Voice services demand synchronous or isochronous connections, which require priority techniques in the Medium Access Control (MAC) protocols in order to give voice users precedence over non voice users. If priority services are involved, usually a centralized control scheme is used. In these schemes, a centralized unit (e.g., a base station) controls all traffic on the channel. It instantaneously allocates bandwidth for each user and can therefore prioritize delay-sensitive traffic like voice or video. However, using centralized control is less attractive for networking because the network communication units preferably are peers to one another. For example, the worldwide Internet is based on a peer-to-peer protocol. In these protocols, the channel is the key element of the network. Communication units that are added to the network may gain access to the channel by distributing the channel access control. However, the concept of distributed control and the peer concept goes against the usage of priority traffic in which certain communication units (providing delay-sensitive traffic) should have priority over other communication units. With the advent of multimedia services, prioritization has become essential.

Recently, a different distributed protocol was proposed that is based on a Ping-Pong protocol that involves a virtual token distribution. This is described in "Method and apparatus for medium access on a radio channel" by J. C. Haartsen, U.S. patent application Ser. No. 60/180,095, filed Feb. 3, 2000, which is hereby incorporated herein by reference in its entirety. In accordance with this scheme, each packet transmission coincides with a token exchange. Communication unit A, owning the token, can send a packet to communication unit B. Communication unit B, receiving the packet, also receives the token and is therefore allowed to transmit as soon as the packet from communication unit A has been received. To allow for prioritized traffic, priority or recovery slots are defined, which give a communication unit unconditional access to the channel. For example, when a priority slot associated with communication unit A arrives, communication unit A is allowed to transmit regardless of whether it received the token by means of a previous packet transmission; that is, at a priority slot, the token is given unconditionally to the communication unit associated with the priority slot.

The token Ping-Pong protocol as described in U.S. patent application Ser. No. 60/180,095 does not describe how the token is distributed among the communication units in the interval in between the priority slots. A communication unit that receives the token can send the token (along with its transmission) to any unit, but there are no rules governing to which communication unit the token should be sent. Therefore, when two communication units exchange information continuously, they keep exchanging the token between themselves while other communication units are starved (apart from the communication units that have priority slots that receive the token unconditionally some of the time). Yet, if a token distribution strategy is to be considered, the bandwidth requirements of the participants should be taken into account. Thus, there is a need in the art for a token distribution scheme that enables the token to circulate between the communication units participating on the channel, while at the same time taking into account the bandwidth requirements of the participants.

SUMMARY OF THE INVENTION

Accordingly, the present invention is directed to a method and apparatus for network token distribution that substantially obviates one or more of the shortcomings or problems due to the limitations and disadvantages of the related art.

In an aspect of present invention, in a token-based network communication system having a number, N, of nodes, wherein a token-possessing one of the N nodes is permitted to transmit on the shared channel, and wherein each of a number, L, of the N nodes includes a number, M, of counters, and each of the M counters is associated with a respective one of M nodes of the N nodes, and $M \leq L \leq N$; a method of arbitrating access to the shared channel includes assigning a priority level to each of the M counters, such that the assigned priority level for a respective one of the M counters among all of the L nodes is the same and at least two of the M counters are assigned a different priority level. The method also includes assigning a corresponding initial count value to each of the M counters. In this aspect, a token-possessing one of the N nodes identifies one of a remaining number of other nodes of the N nodes for receiving the token based, at least in part, on at least one of relative count values of the M counters in the token possessing node and the assigned priority levels of the M counters in the token possessing node. The token-possessing node explicitly or implicitly transfers the token to the identified node, and the count value of the counters associated with each of the M nodes in each of the L nodes are adjusted each time the token is transferred. The above-described identifying, token transferring and count value adjusting processes are repeated, thereby permitting a plurality of nodes in a network to transmit on a shared channel.

In a further aspect of the present invention, one or more of the N nodes are assigned a corresponding priority slot that occurs during one slot of a plurality of sequentially occurring time slots. When a current time slot coincides with one of the priority slots, the above-described identification process is bypassed and the token is instead passed to a node that is assigned the coinciding time slot.

In yet another aspect of the present invention, a system for arbitrating access to a shared channel in a token-based communication network includes a plurality of nodes sharing a channel. The system is capable of implicitly or explicitly passing a token, thus permitting the token-receiving node access to the shared channel. The system includes a shared channel medium and a number, N, of nodes that are capable of communicating with one another along the shared channel medium. Each of a number, L, of the N nodes in the system is associated with a token machine for tracking and passing the token, where $L \leq N$. Each token machine includes a number, M, of counters that are respectively associated with a corresponding one of a number, M, of the N nodes, where $M \leq L$. These M counters also are assigned a priority level such that at least two of the M nodes have a different priority level. Upon formation of the channel, each of the counters is set to their respective initial count value. The token machine also includes a processor for monitoring and controlling the counters. The processor is configured to select one of the N nodes to transfer the token.

Additional aspects and advantages of the invention will be set forth in the description that follows, and in part will be apparent from the description, or may be learned from practice of the invention. The aspects and advantages of the invention will be realized and attained by the system and method particularly pointed out in the written description and claims hereof as well as the appended drawings.

It should be emphasized that the terms "comprises" and "comprising," when used in this specification, are taken to specify the presence of stated features, integers, steps or components; but the use of these terms does not preclude the presence or addition of one or more other features, integers, steps, components or groups thereof.

It is to be understood that both the foregoing general description and the following detailed description are exemplary and exemplary only and are not restrictive of the invention, as claimed.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention. In the drawings.

DETAILED DESCRIPTION

These and other aspects of the invention will now be described in greater detail in connection with exemplary embodiments that are illustrated in the accompanying drawings.

The present invention is useful for allowing nodes connected within a network environment to share access to a common channel by way of a token distribution method and apparatus. The method and apparatus of the present invention provide an efficient allocation of effective channel bandwidth to nodes (e.g., communication units) on the common channel that may require transmission of priority services involving delay-sensitive information (e.g., voice, video). The term "unit(s)" may include computers, portable computers, printers, and/or other peripheral devices such as a headset or a mouse, and/or radio connectable devices, such as PDAs, mobile phones and the like. The channel may include wired and/or wireless links, for example, cable, fiber, and/or radio links. Radio links used to transmit on the channel may be established with portable radio communication equipment. The term "portable radio communication equipment" includes all equipment such as mobile telephones, pagers, communicators (e.g., electronic organizers, smartphones) and the like.

It should be understood that the term "fair token distribution," as used herein, does not necessarily mean that a token is distributed equitably among participating nodes on a shared channel, although a fair token distribution scheme in accordance with the invention may be configured to and/or may operate such that equitable token distribution is substantially allowed or approximated. Nodes participating in fair token distribution in accordance with the invention are generally nodes sending best-effort (asynchronous) data traffic, so-called "best-effort nodes." However, every node sharing a channel may not necessarily be a best-effort node. Nodes carrying delay-sensitive traffic, such as priority or "real-time" (asynchronous or isochronous) data traffic, also may be sharing a common channel with nodes carrying best-effort data. Token distribution schemes described herein include strategies that allow a token to circulate between the best-effort nodes participating on a shared channel in a "fair" way (e.g., to reduce or eliminate occurrences when nodes are starved of the token) while coping with bandwidth requirements of all channel participants, which may include nodes carrying delay-sensitive or other priority type data traffic.

Figure 1:
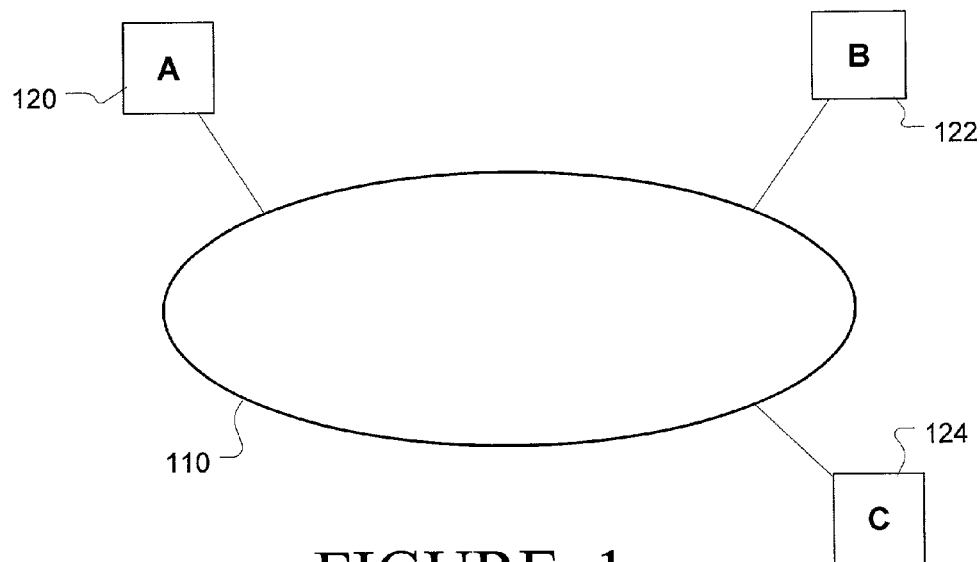
FIG. 1 is a diagram showing a channel configuration of a peer network with several participants.

FIG. 1 shows a general system 100 in which the token distribution scheme of the present invention may be used. In system 100, a single channel 110 is shared by participating communication units 120 (communication unit A), 122 (communication unit B) and 124 (communication unit C), however, it is to be understood that single channel 110 may be shared by a larger or smaller number of participants. The channel 110 may be any medium that can support a signal transmission between the participating communication units 120–124 (A–C), such as cable, fiber, and/or air (e.g., in the case of radio transmission). To avoid collisions on the channel 110, only a single one of the communication units A–C can access the channel and transmit data at any moment in time.

While FIG. 1 shows the participating communication units A–C of system 100 to be separately arranged (e.g., physically separated communication units) for purposes of illustration, participants in fair token distribution of the present invention may, in a more general sense, include other types of logical links having start and end points (i.e., nodes) between which a token may be distributed. For example, participants may include a plurality of nodes (points) that reside in a single physical device. As a result, there may be more participating nodes than there are separate physical communication devices on the channel. Moreover, as discussed later in connection with other exemplary embodiments of the present invention, it is not required that every node sharing a channel be a participant in a fair token distribution scheme in accordance with the invention. Thus, there may be more nodes in total on a channel than there are participating nodes. While exemplary embodiments described herein include "communication units" as the participating nodes for purposes of explaining the invention, it should be appreciated that characterizations of node types that may be used in practicing the invention are any of those that capable of establishing a link on a shared channel and capable of receiving and passing a token on the shared channel, and/or combinations thereof.

In system 100, time division multiplexing (TDM) is used to allow the multiple communication units A–C to communicate, so each has to wait until the channel medium is free before transmission can start. As discussed previously, several multiple access control (MAC) protocols have been considered in the past, especially for best-effort data traffic. A widely-used protocol is based on CSMA (carrier-sense multiple access), which is also called listen-before-talk. In CSMA, a communication unit listens to determine if the channel is free, and if so, it transmits a packet. However, these types of MAC protocols are less suitable for delay sensitive traffic, or when priorities in traffic streams have to be made, because they are, to a large extent, peer protocols. This is a particular concern in multimedia services because delay sensitive information like voice or video has to have priority over other services, such as best effort services. Hence, known peer-to-peer protocols are less suitable for supporting multimedia traffic cases.

In a channel shared by several peer nodes, each node may send a packet to each other node. Transmission is carried out in bursts or packets. The present invention utilizes a convenient and simplified scheme for distributing a network token among nodes sharing a channel. The scheme also may include prioritizing token possession in a scheduled time (or slot) to control latency and bandwidth allocation. The concept of prioritization is described in the following.

Figure 2:
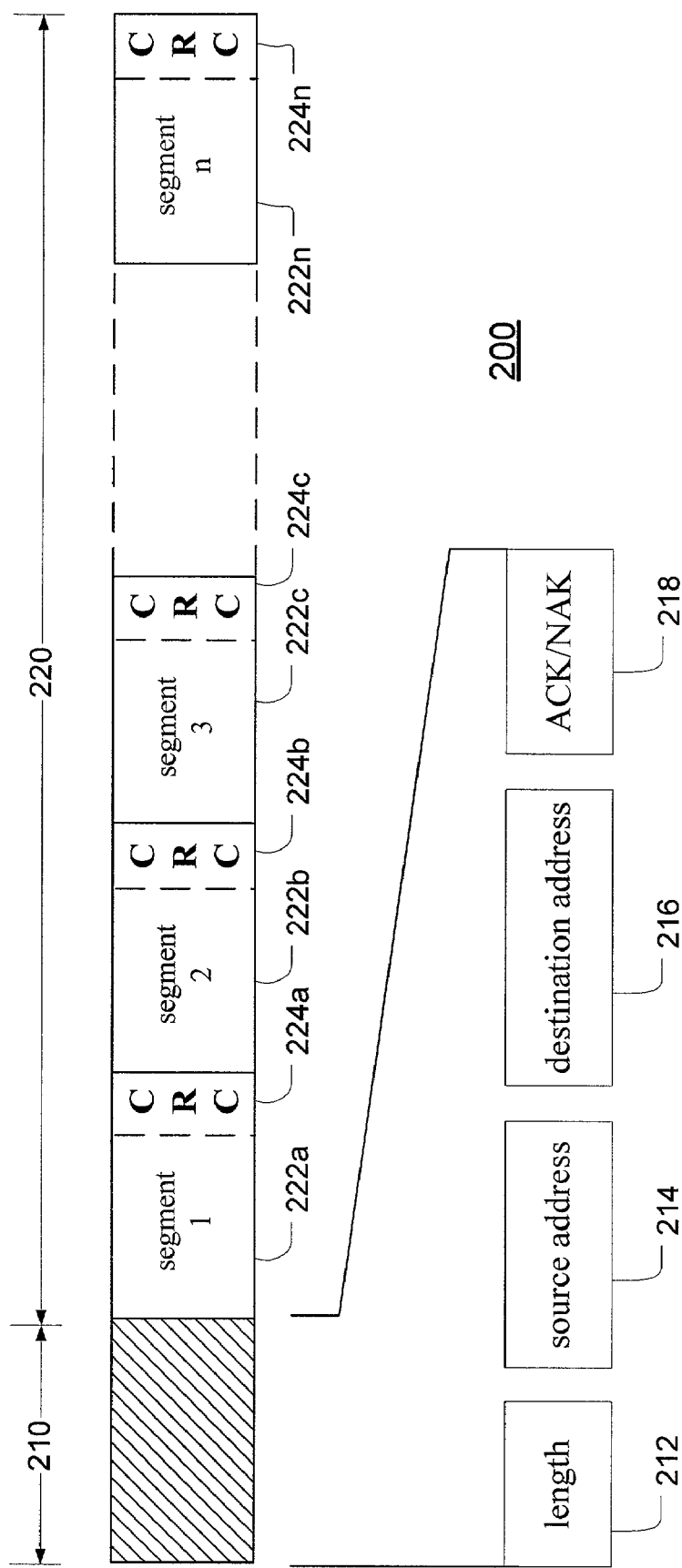
FIG. 2 is a diagram illustrative of a typical packet format on a peer channel.

FIG. 2 shows a typical packet format in simplified block form. The packet format includes a header section 210 and a payload section 220. The header section 210 is divided to include several subsections 212–218 that provide the network with information that is necessary to handle the packet. Subsection 212 contains information relating to the length of the packet, subsection 214 contains information relating to the source address identifying the sender of the packet, subsection 216 contains information relating to the destination address identifying the intended recipient of the packet, and subsection 218 contains information used in an optional acknowledgment protocol (described below). Data is transmitted in payload section 220, which is divided into segments 222a–222n. Each segment 222a–222n may optionally be checked for errors, for example, by adding a Cyclic Redundancy Check (CRC) portion 224a–224n to respective packet segments 222a–222n, or by including a number of parity bits. It is to be understood that the packet overhead also may include additional information, such as information relating to segment interleaving or latency requirements, for example.

In a recently filed application entitled "Selective-Repeat Automatic Retransmission Query (ARQ) Protocol and/or Ping Pong Protocol" (U.S. Provisional Application No. 60/180,095, filed Feb. 3, 2000), an ARQ protocol was proposed, together with a point-to-point protocol based on a Ping-Pong scheme in which two communication units alternatively transmit and receive. In an additional application, U.S. Provisional Application No. 60/226,965, filed Aug. 22, 2000, and hereby incorporated herein by reference, a Ping-Pong protocol between a plurality of devices based on a token concept was presented. In yet another application, U.S. patent application Ser. No. 09/804,288, entitled "Method for Quality of Service in a Radio Protocol," filed Mar. 12, 2001, hereby incorporated herein by reference, a scheme was described to avoid contention on the priority slots. In each of these references, the notion of priority slots or recovery slots was introduced to provide unconditional access to the channel. Between occurrences of the priority slots, the token is circulated freely between the participants on the channel. The token passing is implicit: a unit that receives a packet receives with it the right to transmit when the current packet transmission is finalized. This free token circulation is interrupted by the priority slots at which time the token (i.e., the right to transmit) is passed to the unit associated with the priority slot(s). Each time slot is numbered from 0 to M−1 with slot counting wrapping around M. Transmission start is preferably carried out at the beginning of a slot, in such a way that the time uncertainty is reduced. Instead of priority slots, in embodiments in which the channel has no time slot notion, priority allocation may be divided among priority times, which are fixed time positions at which the token is unconditionally passed. While the following description assumes a slotted channel, it is to be understood that utilizing priority times instead of priority slots would be a straightforward application of the principles set forth by the exemplary embodiments described herein.

As described above, the token can freely circulate among the participants in between the priority slots. However, a method of passing the token is not trivial. For example, a bandwidth allocation scheme designed for a central control scheme is described in U.S. Provisional Application No. 60/271,715 entitled "Method and Apparatus for Dynamic Bandwidth Allocation in Bluetooth Piconets," filed on Feb. 28, 2001, and hereby incorporated herein by reference in its entirety. That document describes a piconet based on a master and several slaves. The master allocates bandwidth between the slaves according to a specific polling scheme. The master contains a polling machine which includes several counters, each counter being associated with a slave. The counters are initialized with begin values that represent the polling intervals for the slaves and are derived from the bandwidth requirements of the slaves. The counters are periodically decremented. If a counter reaches zero or becomes negative, the associated slave is polled. If more than one counter reaches zero or are negative, the slave with a counter highest on the counter list is served first. Slaves with counters higher on the list therefore have priority over slaves lower on the counter list.

In the present invention, instead of a centralized master controlling the bandwidth allocation between the slaves through a central (located in the master) polling machine, a distributed control mechanism is used with token machines distributed among some or all of the participating nodes on the shared channel. In an embodiment of the invention, counters in the token machine are associated with nodes carrying best-effort traffic (best-effort nodes). Each best-effort node partaking in a token passing scheme according to this embodiment is therefore associated with a counter in each token machine of each node participating in the scheme. The token machine concept of the present invention, discussed later in detail, provides a fair token passing between the best-effort nodes. Nodes carrying real-time or priority traffic, so-called priority nodes, do not necessarily have an associated counter in the token machine. Yet, in another embodiment, priority nodes may have token machines that at least include counters associated with the best-effort nodes sharing the channel. The latter embodiment provides a method of passing the token from one of the priority nodes to a best-effort node that is identified by a token passing scheme of the present invention as the next node for receiving the token. In yet a further embodiment, a priority node may have an associated counter in each of the token machines.

In the general case of logical links having start and end points (or nodes), the counters in the token machine correspond to source nodes (start points) that have best-effort data to send. The number of counters in use equals the number of nodes on a shared channel that are participating in a fair token passing scheme in accordance with the invention. Each of these nodes has the same token machine. Of course, it is to be understood that "same token machine," as used herein, means nodes have either identical token machines or token machines that function identically to one another. If several best-effort nodes reside in a same physical device, each of these nodes may use (share) a same token machine that is associated with the device. Alternatively, a same physical device may include several nodes, each having their own associated token machine, and/or combinations of nodes in which some share same token machines, some are associated with their own respective token machine, and some that are not associated with any token machine.

As with the polling machine described above, the token machine includes a list of counters. The list of counters on each token machine is prioritized such that best-effort nodes carrying traffic with higher priority are higher in the list. The counters may be numbered to indicate their relative priority with respect to one another. For example, the counters may be numbered consecutively, like 1, 2, . . . , M, where, for example, the counter with the lowest number has the highest priority and the counter with the highest number has the lowest. Under this strategy, counter 1 is associated with, for example, a communication unit having the highest priority, counter 2 is associated with a communication unit having the second-highest priority, and so on. In an exemplary alternative strategy, the above-described order of priority may be reversed such that the counter with number M is the highest priority and counter number 1 is the lowest priority. It is to be understood that the counter list may include any type of symbol that can be associated with a counter and designate a relative priority level for that counter. The counters are initialized with certain begin values, as will be discussed later.

Figure 3:
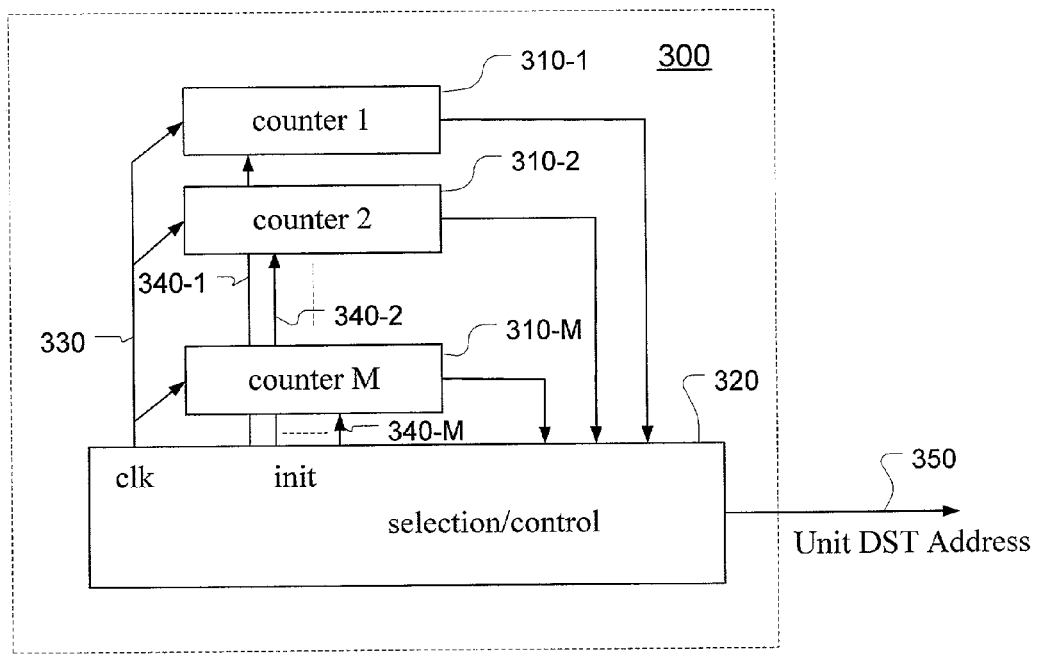
FIG. 3 is a block diagram of an exemplary token machine in accordance with an embodiment of the present invention.

FIG. 3 shows an exemplary token machine 300 in accordance with an embodiment of the present invention. The token machine 300 includes a list of counters 310-1, 310-2, . . . , 310-M, the number M equaling the number of best-effort nodes on a shared channel. It is to be understood that the value M may be set to a predetermined value or may vary dynamically, for example, as nodes are added or dropped from the network. Selection/Control unit 320 includes a clock line 330 controlling each of the counters 310-1 to 310-M. The clock line in each token machine 300 is synchronized, such that after each token passing event, each of the counters is enabled to activate the counter for one counting cycle. Selection/control unit 320 also includes initializing control lines 340-1 to 340-M respectively connected with each counter 310-1 to 310-M. Initializing control lines 340-1 to 340-M operate independently to perform an adjusting function on one of the counters 310-1 to 310-M after its associated node receives the token. The output 350 of control/selection unit 320 is a node destination address (DST) that corresponds to the present destination of the token.

Returning to the network configuration shown in FIG. 1, each of the three communication units 120–124 (A–C) on channel 110 would include a token machine in the case that each unit is partaking in the fair token passing scheme of the present invention (i.e., M=3). Thus, any one of the communication units 120–124 would include a counter associated with itself and each of the other communication units. The counter list would be prioritized in accordance with the type of traffic transferred on each communication unit 120–124. However, it is to be understood that not every one of the units 120–124 must participate in a fair token passing scheme. For example, at different times, one or more of the units 120–124 (or additional nodes being added to the system 100) may be carrying delay-critical traffic and assigned a priority slot, in which case it is unconditionally passed the token during the priority slot. As discussed later in detail, a node assigned to a priority slot does not necessarily (but may) include a token machine. Hence, while a total number, N, of network nodes may be active participants on a shared channel, the number, M, of nodes partaking in a best-effort token passing scheme in accordance with the invention may be less than or equal to the total number of network nodes N. That is, M may take on any value from 1 (only one node is partaking in best-effort token passing) to N (all nodes are partaking in best-effort token passing). Moreover, because one or more nodes may participate on a shared channel without participating in fair token passing (e.g., priority nodes), these nodes still may include a respective token machine including counters associated with best-effort nodes that are participating in fair token distribution. As discussed above, any node having a token machine is aware of which best-effort node is identified for next receiving the token, whether or not the node is participating in the fair token passing scheme. Thus, a number, L, of the N network nodes sharing the channel may be defined as the number of nodes having token machines, where L is $\geq$ M. Of course, L may be equal to N (in which case every node has a token machine), L may be equal to M (e.g., when only nodes participating in a fair token passing scheme include a respective token machine), or L may reside between M and N (e.g., in a case when some, but not all of the priority nodes on the channel have respective token machines without a counter associated with themselves). In view of the foregoing, it can be seen that $M \leq L \leq N$.

With reference again to FIG. 3, counters 310-1 to 310-M of token machine 300 are initialized with a positive begin value, the token interval Tk, where k also ranges from 1 to M, where M is the number of nodes partaking in best-effort traffic (i.e., M=L=N). At the very start (when the channel is created), a one-time initial offset, $\Delta$k, can optionally be added to stagger individual token distribution schemes (e.g., to prevent two communication units with the same Tk from simultaneously having zero or negative counter values; however, this is not mandatory since the priority of the counters will solve distribution if multiple counters become zero or negative). To start the process, the token is (virtually) passed to the node k with the lowest counter value Ck. If there are multiple counters with this same minimum value, the counter highest on the counter list is selected. The node receiving the token is then allowed to transmit a packet. For each new slot (or each token passing event if there are no slots), all counters are decreased by one. This node k will transmit its packet to a new node m. The selection of node m may be based on a number of factors, including:

whether the counter value Cm of node m is most negative in the counter list, a highest priority one of those counters in the counter list having a negative value, or the most negative counter value of all the counters;

whether node k has to acknowledge data previously received from node m;

whether node k wants to send data to node m; and whether node m has the lowest counter value Cm among the counters.

Token transfer between nodes k and m may be either an explicit token transfer or an implicit token transfer. For example, if a token possessing node has something to transfer to another node, the token possessing node may send a packet including an information data payload. This type of packet transfer is referred to in this disclosure as an implicit token transfer, since mere receipt of this packet allows the recipient to respond. If the node has no information to send to another node, it occasionally has to send a packet without a payload, just to enable the other node access to the channel (e.g., to send something). This type of packet transfer without a payload is referred to in this disclosure as an "explicit token transfer."

Depending on the traffic conditions, the amount by which a counter is adjusted may be changed in a dynamic way. For example, if a node repeatedly receives the token, but has no data to transmit, a counter begin (initial) value, or other value by which this token receiving node is adjusted, may be increased in each token machine in each node active in the network. In this case, the frequency at which the token is passed to this node decreases, and thus reduces the bandwidth allocated to that node (and correspondingly increases bandwidth for other nodes). Alternatively, or in combination with changing a value by which the token receiving node is adjusted, the amount by which counters are incremented/decremented may be modified. A packet header also may contain information that may be used to dynamically adjust counter values according to the bandwidth and/or priority requirements of the payload information. Another way to change the effective bandwidth for a node would be, for example, to change its counter priority in a priority list of the token machines.

Occasionally, the token machines should be reinitialized because errors may cause the machines to be out of synchronization (sync). Out of sync is not a major problem because the decision regarding to which node to send the token resides only in the node that momentarily has the token, so it does not result in contention. However, the token distribution scheme may become less efficient when the token machines become out of sync. Reinitialization of the token machines may be accomplished, for example, by way of a broadcasting scheme in which the status of the token machine associated with one node is distributed to each of the other units, thereby reinitializing the counters in the token machines of all nodes to the same respective values. For example, this may be accomplished by a node broadcasting a message to each of the other nodes, wherein the reinitializing message is in turn broadcast by nodes in rotating or random order. In another exemplary alternative reinitialize scheme, one node may be designated to periodically broadcast a reinitialization message to each of the other nodes.

The logical connections between the nodes on the channel can (but do not necessarily need to) include an Automatic Retransmission Query (ARQ) scheme which forces the recipient to acknowledge the received information. In an ARQ scheme, a recipient responds with an ACKNOWLEDGMENT (ACK) if the information was received correctly or with an NAK if it was not received correctly. In the aforementioned U.S. Provisional Application No. 60/180, 095, which is incorporated herein by reference, an efficient selective-repeat ARQ scheme was described which can be used in combination with the current invention.

With reference again to FIGS. 1 and 2, ACK/NAK information 218 can conveniently be carried (i.e., piggybacked) in the header 210 of a return packet. If communication unit A has to send something to communication unit B, it can at the same time in the header confirm the reception of data received from B. If communication unit A has no data to send to communication unit B, but unit A wants to acknowledge data received from unit B, it only sends the (short) packet header. Since the ARQ protocol, as described in U.S. Provisional Application No. 60/180,095, adapts to the packet sizes and introduces no extra overhead due to short packets, errors introduced into transmitted packets may be detected and the correct data retransmitted efficiently to conserve the effective channel bandwidth.

In one exemplary embodiment of the present invention, if a node k is part of a best-effort token passing scheme and receives a packet, the counter value Ck of node k may be adjusted by resetting Ck to its initial value Tk (now without offset Δk) in each token machine in each of the L nodes (i. e., nodes with token machines). However, Ck may be adjusted in other ways. For example, instead of resetting Ck to be its initial value Tk, an alternative adjustment may include making Ck equal to a value that is a function of its initial value, such as by adding the initial value Tk to a current Ck value. Other ways may include making Ck equal to an amount, or equal to a function of a value included within information data (e.g., a packet header) waiting in node k, indicating a required bandwidth. It is preferable that the adjustment of Ck is carried out identically in all token machines (i. e., in each token machine of all L nodes).

As a result of node k receiving a packet, it also receives the token and has the right to send on the channel. In response to receipt of the token, node k first determines whether the counter values in the token machine are all positive. If one of the counters Cm is negative, it sends a packet to the associated node m. If several nodes have a negative counter value, the node m that is associated with the highest priority counter in the counter list of these several nodes is selected. Alternatively, if several counter values are negative, the node m with the most negative counter value is selected. If node k has information to send to node m, it will append a payload to the packet. If not, it only sends a header, including possible ACKNOWLEDG-MENT information of preceding receptions. If no counter value is negative, but an ARQ protocol is implemented, the node k preferably sends a packet back (and with it the token) to the sender to ACK or NAK the received data. If there is no data to acknowledge, it may send a packet to a node m for which node k has information waiting to be sent. If no data is waiting, node k may send a packet (header only if no data is available) to that node m corresponding to the counter having the lowest (but positive) value in the counter list. After each slot (or after each transmission in case there are no slots) all counter values Ck in every token machine are decremented by 1. While a Ck counter value of zero has been described as a threshold, or benchmark reference value from which values of the M counters are measured, it is to be understood that this threshold value may be any designated or predetermined value toward which the m counter values are incremented (or decremented).

The token circulation can be overruled by the priority (reserved) slots. As discussed above, priority slots may be provided to meet throughput, latency, and/or quality of service requirements of a node (e.g., for meeting requirements of nodes carrying delaycritical synchronous or isochronous traffic, such as voice, video or multimedia). At a priority slot, the token is unconditionally passed to the node that owns this priority slot. As the owner of the priority slot obtains the token, it has the right to send. This node has to transmit a packet on the priority slot. A channel may include nodes owning priority slots that are either participants of a token distribution scheme or part of a scheme in which best-effort services are separated from priority services.

In an exemplary embodiment in which a node owning a priority slot is also incorporated into the token distribution scheme, the node has an associated counter included among the M counters of each token machine and that counter is placed at a high priority level. In principal, when priority services are included in the token distribution scheme, priority slots would not strictly be required since their high priority level counters in the token machines will automatically provide a priority service. However, in a practical application of the present embodiment, use of priority slots within a token distribution scheme are still preferred to allow for recovery from an error condition. For example, a node owning a priority slot can re-inject the token into the system after a token-losing event, such as when a packet fails. Priority slots also may re-inject the token into the system, for example, in a scenario involving a nonparticipating node (i.e., a node that does not track counter values of the nodes participating in the token distribution scheme) that receives the token, but does not have information for transmission to another node.

In an alternative embodiment of the token distribution scheme in which best-effort services are separated from priority services, only nodes dealing with best-effort services are participants in the token distribution scheme (i.e., only best-effort nodes have respective counters included among the M counters of each token machine). During priority transactions (at the priority slots and the slots immediately following but covered by the transmission that started on the priority slot), the M counters are either ignored (no change) or decremented as usual.

FIGS. 4a–4d show first through fourth exemplary token distribution processes in accordance with the present invention. Same reference characters in FIGS. 4a–4d are intended to represent same or like processes.

Figure 4A:
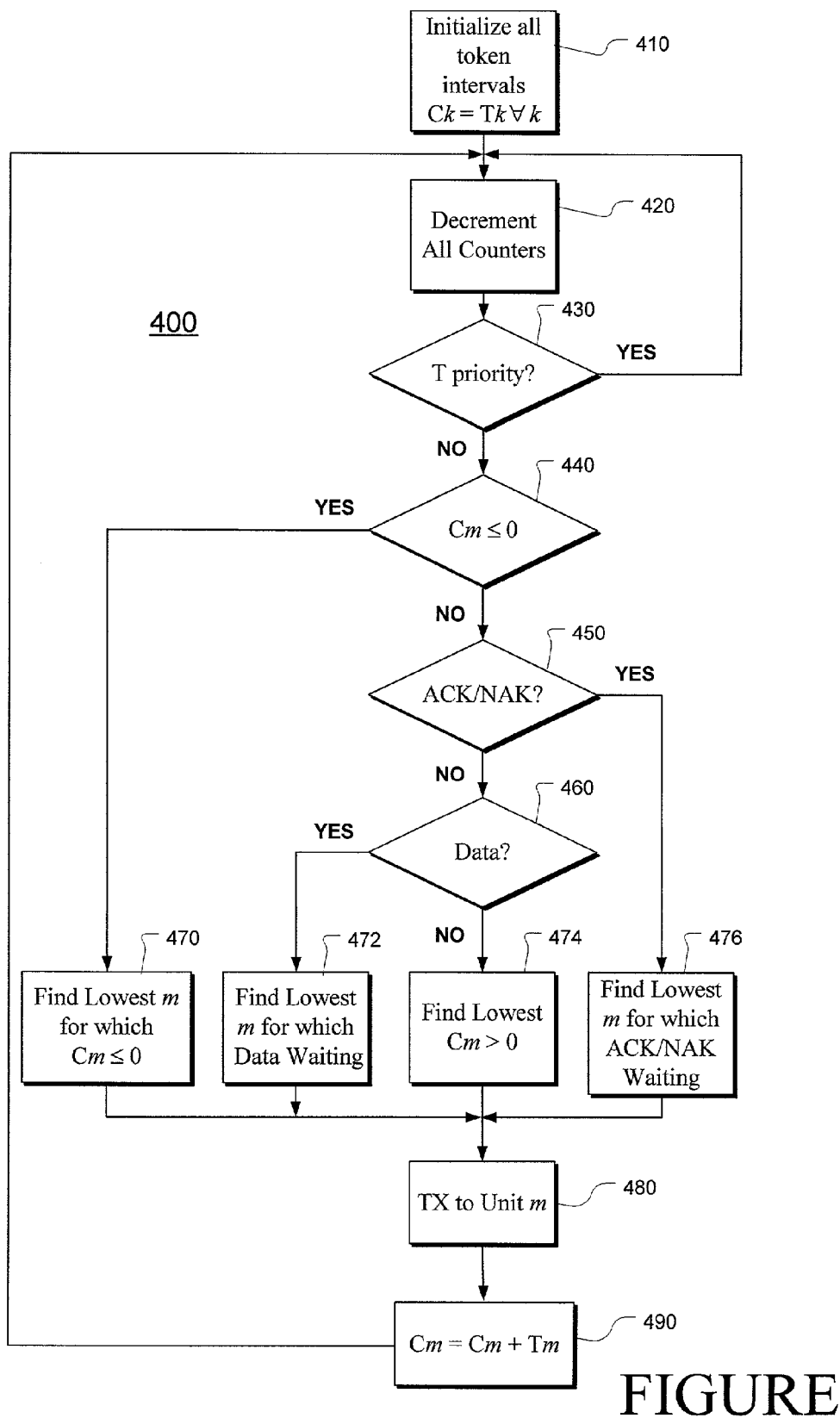
FIG. 4a is an exemplary first process diagram for token distribution in accordance with the present invention.

With reference to FIG. 4a, a complete exemplary token distribution process is summarized in a process flow diagram 400. It is assumed that the token resides with communication unit x, obtained either by a priority slot or by a previous reception of a packet. Some processes (processes 410 through 490) are carried out in the token machine of the communication unit that currently owns the token (say communication unit x) and some processes are carried out in the token machines of all communication units participating on the link (processes 410, 420, 490). In the following exemplary embodiments shown in FIGS. 4a–4d, a number, M, of communication units are sharing a common channel. Each communication unit, m, of the M communication units includes number of counters (also equal to M) in the token machine of the unit m, and each of these counters is associated with a respective one of the M communication units and has a counter number (also indicated as m for an associated communication unit m) in a counter list. It is to be understood that more than M communication units (or more generally, nodes) may be sharing the channel. As discussed above, a node owning a priority slot may or may not have counters associated with the other nodes on the shared channel. Moreover, other nodes may be sharing the channel without participating in token distribution for best-effort traffic.

As shown in diagram 400, all counter values in all token machines are initialized in process 410 with the token intervals Tk and possibly an offset (not shown). In process 420, all counters are decremented by 1, i.e., Ck=Ck−1 for all k. This can be initiated by the next token exchange or preferably by the slot progression. In process 430, communication unit x owning the token determines whether at this time there is a priority event/slot. If the answer is "yes," then the token is implicitly passed to a communication unit that owns the priority slot and all M counters are decremented (process 420). If several priority slots overlap, the communication unit m owning the overlapping slot and having the lowest value of m (i.e., highest priority) receives the token. If there is no priority slot, communication unit x checks in process 440 to determine whether any of the counters have reached zero or a negative value. If the answer is "yes," then in process 470 unit x identifies a highest-priority one of those communication units whose counter is equal to or smaller than zero. In the exemplary embodiment, the counter number, m, indicates priority, with relative priority decreasing as m increases.

In process 480, communication unit x sends a packet to communication unit m. Communication unit m thus receives the token and, in process 490, its counter value Cm in all communication units is adjusted based on Tm.

If no counter has reached zero ("no" path out of process 440), communication unit x next determines whether there is ACK/NAK information waiting for transmission in process 450. If so, in process 476 it selects the communication unit m with the lowest m for which ACK/NAK is waiting and transmits a packet to this communication unit m in process 480.

If no ACK/NAK is waiting ("no" path out of process 450), communication unit x determines, in process 460, whether data is waiting to be transmitted. If yes, then the communication unit m with the lowest m for which data is waiting is selected in process 472 by communication unit x and communication unit x sends a packet to communication unit m in process 480.

When there is no data waiting, the token is passed to the communication unit m with the lowest counter value Cm (Cm being bigger than zero though) (processes 474 and 480).

In an alternative embodiment (not shown), when there is no data waiting the token may be "killed" (i. e., the token is not sent at all). Circulating the token when there is no data to send needlessly consumes power, so during these times the system can enter into a low-power mode. All units can sleep until the next priority slot in which the token is again injected into the channel. The present alternative embodiment would therefore require the existence of priority slots.

Thus, the unit owning the token decides to which other unit the token is transmitted (unless there is a priority slot and the token resides at the priority unit without explicit token/packet transmission). The counter of the communication unit that gets possession of the token is adjusted in every token machine based on its associated token interval (process 490). Then the counters of all the communication units are decremented in every token machine (process 420) and the entire procedure repeats.

Figure 4B:
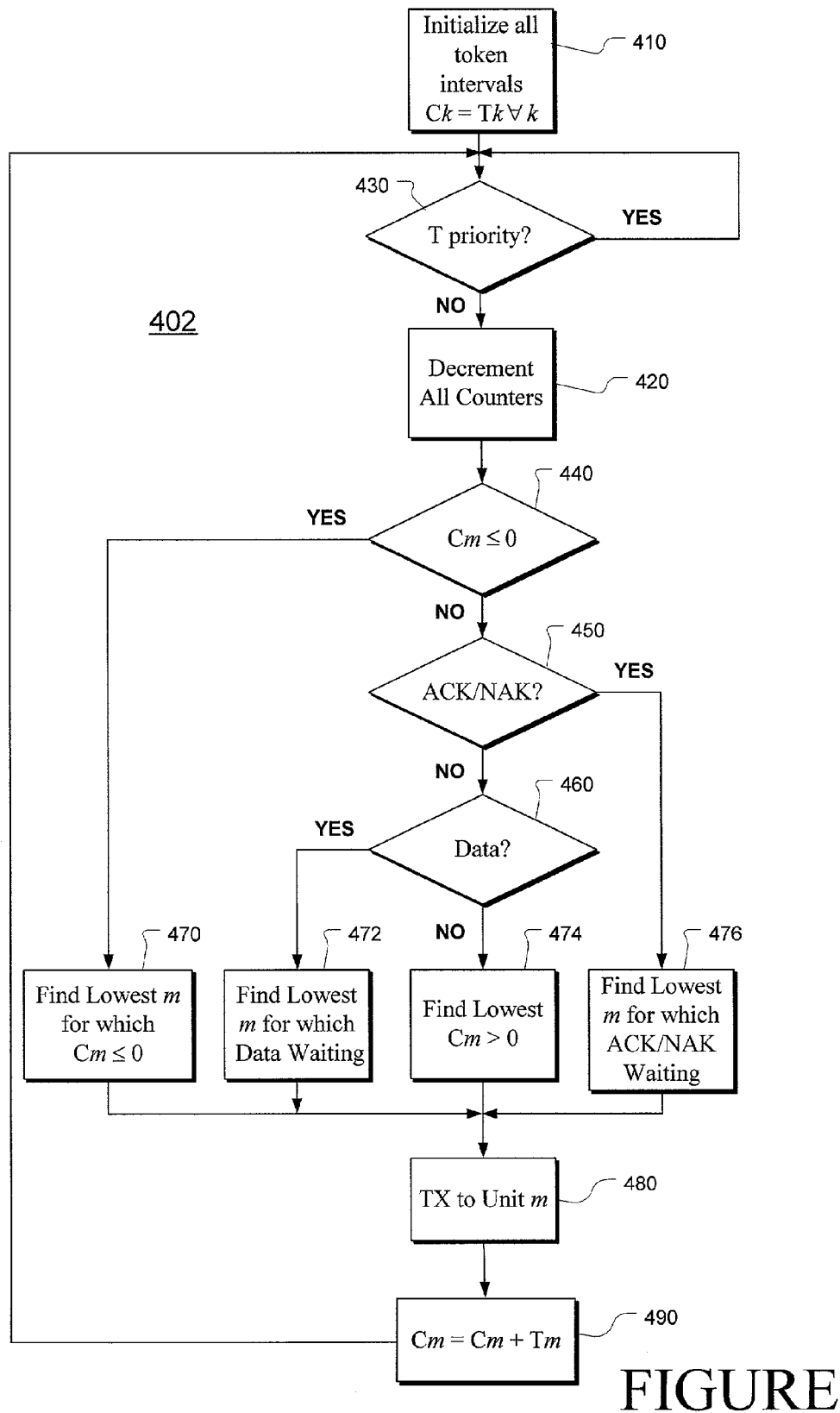
FIG. 4b is an exemplary second process diagram for token distribution in accordance with the present invention.

FIG. 4b shows a second exemplary process diagram 402 in accordance with the present invention. Process diagram 402 differs from comprehensive process diagram 400 of FIG. 4a in that counters are ignored (i.e., not adjusted) during a priority slot occurrence. In FIG. 4b, this is represented by the "yes" path out of process 430 that returns to the same decision process 430.

Figure 4C:
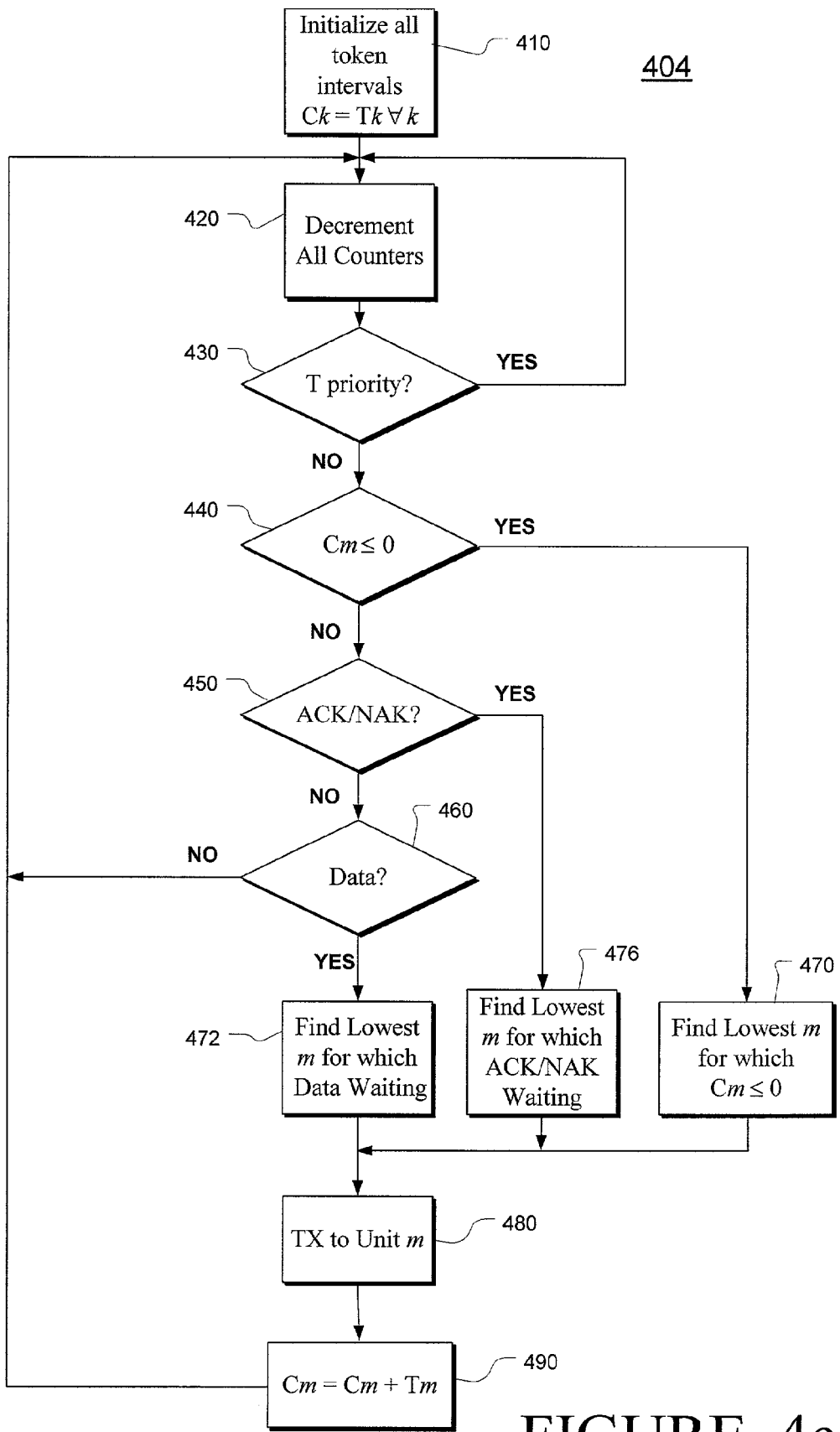
FIG. 4c is an exemplary third process diagram for token distribution in accordance with the present invention.

FIG. 4c shows a third exemplary process diagram 404 in accordance with the present invention. Diagram 404 is similar to diagram 400 of FIG. 4a except that a default process (i.e., process 474 of FIG. 4a) into which the "no" path out of decision process 460 has been eliminated and "no" path is fed back to the counter decrementing process 420. In process diagram 404, the token is not transferred unless one of the following occurs: a priority slot, one of the counters is less than or equal to zero, or ACK/NAK or other data is waiting for transfer. Thus, until one or more of the Cm values reach zero or are negative, counters are not adjusted by an initial value (process 490) when information is not being transferred between the nodes on the shared channel.

Figure 4D:
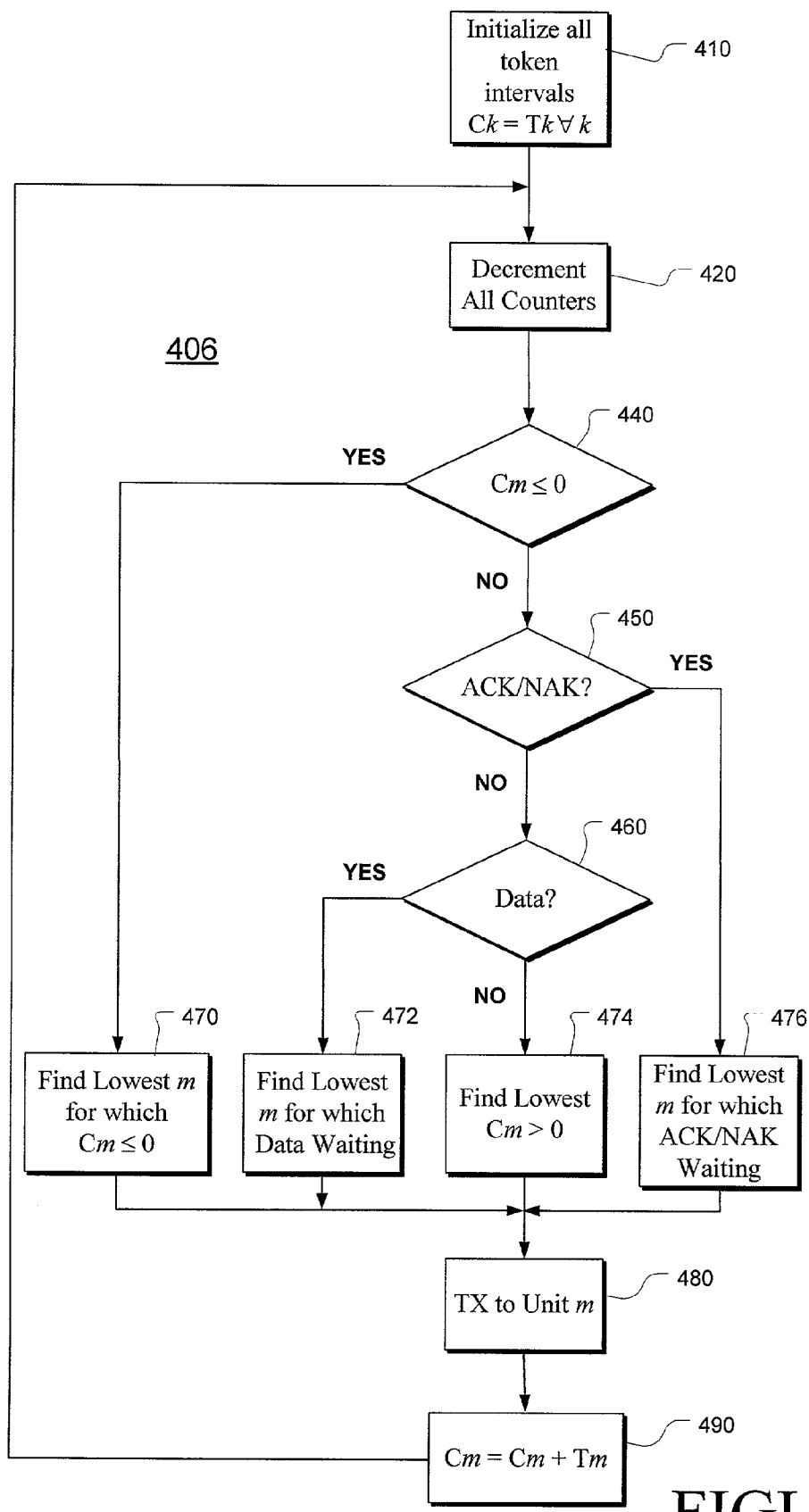
FIG. 4d is an exemplary process diagram for token distribution in accordance with the present invention.

FIG. 4d shows a fourth exemplary process diagram 406 in accordance with the present invention. Process diagram 406 is essentially the same as process diagram 400, but without priority slots in the distribution scheme. Priority slots still may be defined, but only used to re-inject the token if it becomes lost.

The token machines and priority slots provide a convenient access technique in which multimedia traffic with different priorities can be supported. The Tk values on which the nodes agree determine the access opportunities each node obtains. If the Tk is lower, a node obtains access to the channel more frequently. In addition to the Tk, the nodes can agree on a maximum size Sk of the packet each node k is allowed to transmit. Tk controls the latency, whereas Sk controls the instantaneous bandwidth usage. Together, Tk and Sk determine the average bandwidth allocated to node k.

The implementation of the token machine shown here in FIGS. 4a–4d in this application is not restricted in any sense. Counters can be implemented in software or any other method where a tracking of the time elapse since the last channel access can be carried out.

It was explained earlier that some processes (e.g., the processes 410 through 490) are carried out in the token machine of the node that currently owns the token (say communication unit x) and that some processes (410, 420, 490) are carried out in the every token machine associated with respective nodes sharing the channel. It will be recognized that in order for these other nodes (i.e., those communication units that are not communication unit x) to perform process 490 (i.e., reinitializing the counter Cm, for example, to a value of Tm+Cm), it is necessary for these other nodes to know the value of m (i.e., to know which node has just received the token). This information may be provided to nodes participating on the channel by a transmitted data packet. Referring again to FIG. 2, each data packet includes a header 210 that may include a source address 214 and a destination address 216. Because each node sharing the channel can monitor transmissions from any other node, the value m may be derived from the destination address of a packet transmitted on the channel in process 480. For example, each of the N nodes listens for header information corresponding to the destination (and the source) as well as the length of a packet being transmitted. Each node therefore knows where the token is being sent and the length of time needed for the packet transmission. The destination node determines that it is the intended recipient and receives the packet (and thus the token). Meanwhile, because the packet length is known by each of the listening nodes from the transmitted header, nodes not involved in the transmission may "sleep" (e.g., enter into a low power mode) until the transmission is complete.

To facilitate an understanding of the invention, many aspects of the invention have been described in terms of sequences of actions to be performed by elements of a computer system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, optical disk or carrier wave (such as radio frequency, audio frequency or optical frequency carrier waves) containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

The invention has been described with reference to particular embodiments. However, it will be readily apparent to those skilled in the art that it is possible to embody the invention in specific forms other than those of the preferred embodiment described above. This may be done without departing from the spirit of the invention.

For example, in the exemplary embodiments, adjustment of the counter has been illustrated as a "decrement by 1" operation. However, in alternative embodiments, adjusting the counter need not be in the form of a decrementing operation; the counter could alternatively be adjusted by adding a value to the counter. Furthermore, the amount of counter adjustment need not be a value of 1 in all embodiments. It could alternatively be any value.

Moreover, while the above exemplary embodiment describes that the communication unit m is identified in processes 470, 472, 476 and 478 as the "lowest m" (highest priority) communication unit, the identified unit (or node) m alternatively may be selected based on a node m having a lowest or most negative counter value Cm (in the case in which counter values are decremented (process 420) after a token-passing event). Of course, in a scheme in which counters are incremented after a token-passing event, node x (token possessing node) may pass a packet to a highest priority node m that is associated with a highest counter value. In such alternative processes, if more than one of the M counters meet the selection criteria (e.g., a set of several counters having an identical value equal to a predetermined threshold or equal values corresponding to a distance past the predetermined threshold), then the node selected for receiving the packet is the highest priority level one among the several nodes having met the criteria.

Furthermore, in the illustrated embodiments, a communication unit was considered to have a higher priority than another communication unit if its counter number was lower than that of the other unit. However, in alternative embodiments, different strategies could be adopted to indicate priority levels (e.g., having higher counter numbers represent higher priority levels).

It will be apparent to those skilled in the art that various changes and modifications can be made in the automatic optimization of linearity for the method and apparatus for fair token distribution of the present invention without departing from the spirit and scope thereof Thus, it is intended that the present invention cover the modifications of this invention provided they come within the scope of the appended claims and their equivalents.

What is claimed is:

1. A method of arbitrating access to a shared channel of a token-based network communication system including a number, N, of nodes, wherein a token-possessing one of the N nodes is permitted to transmit on the shared channel, and wherein each of a number, L, of the N nodes includes a number, M, of counters, each of the M counters is associated with a respective one of M nodes of the N nodes, and $M \leq L \leq N$, the method comprising:

a) in each of the L nodes, assigning a priority level to each of the M counters, wherein the assigned priority level for a respective one of the M counters among all of the L nodes is the same, and at least two of the M counters are assigned a different priority level;

b) assigning a corresponding initial count value to each of the M counters;

c) identifying by the token-possessing one of the N nodes one of a remaining number of other nodes of the N nodes for receiving the token based, at least in part, on at least one of relative count values of the M counters in the token possessing node and the assigned priority levels of the M counters in the token possessing node;

d) explicitly or implicitly transferring the token to the identified node;

e) in each of the L nodes, adjusting the count value of the counters associated with each of the M nodes each time the token is transferred; and f) repeating steps c) through e).

2. The method according to claim 1, wherein transferring the token comprises implicitly transferring the token when one of the identified nodes receives a data packet.

3. The method according to claim 2, wherein the data packet comprises a header and a data payload section.

4. The method according to claim 1, wherein transferring the token comprises explicitly transferring the token when one of the identified nodes receives a data packet.

5. The method according to claim 4, wherein the data packet comprises a header without a payload.

6. The method according to claim 1, wherein M is less than N.

7. The method according to claim 1, wherein at least one of the N nodes is a communication unit.

8. The method according to claim 1, wherein the transmission of the token starts at a boundary of one of a plurality of sequentially occurring time slots.

9. The method according to claim 8, wherein adjusting the count value of the counters comprises:

in each of the L nodes, adjusting by incrementing or decrementing the count value of the counters associated with each of non identified ones of the M nodes by a fixed amount; and in each of the L nodes, adjusting the count value of the counters associated with the identified node by an amount based, at least in part, on its initial count value.

10. The method according to claim 8, comprising, prior to step c), the step of assigning to at least one of the N nodes a corresponding priority slot that occurs during at least one slot of the plurality of sequentially occurring time slots.

11. The method according to claim 10, wherein if a current time slot coincides with one of the assigned priority slots, then step c) is bypassed and the token is passed to one of the N nodes assigned the coinciding priority slot.

12. The method according to claim 10, wherein M is less than N.

13. The method according to claim 11, further comprising: determining whether several of the assigned priority slots overlap during a coinciding current time slot; and transferring the token to one of the several nodes determined to have the overlapping assigned priority slot and an associated highest priority counter.

14. The method according to claim 10, wherein identifying one of a remaining number of other nodes comprises identifying a highest priority one of the nodes associated with the counters having a value that is equal to or has passed a predetermined threshold value.

15. The method according to claim 10, wherein identifying one of a remaining number of other nodes comprises identifying one of the M nodes whose associated counter count value is closest to a predetermined threshold value.

16. The method according to claim 10, wherein identifying one of a remaining number of other nodes comprises identifying one of the nodes waiting for transfer of information from the token-possessing node and having a highest priority associated counter of the waiting units.

17. The method according to claim 10, further comprising:
generating acknowledgment information in the identified node in response to receiving the token, wherein the acknowledgment information indicates success or failure of at least part of information transferred with the token.

18. The method according to claim 17, wherein identifying one of a remaining number of other nodes comprises identifying one of the M nodes associated with a highest priority counter waiting for transfer of the acknowledgment information from the token-possessing node.

19. The method according to claim 1, wherein identifying one of a remaining number of other nodes comprises identifying one of the M nodes having a highest priority associated counter and count value that is equal to or has passed a predetermined threshold value.

20. The method according to claim 1, wherein identifying one of a remaining number of other nodes comprises identifying one of the M nodes having an associated count value closest to a predetermined threshold value.

21. The method according to claim 1, wherein identifying one of a remaining number of other nodes comprises identifying one of the M nodes having one of an associated count value equal to a predetermined threshold value and an associated count value at a greatest distance passed the predetermined threshold value.

22. The method according to claim 1, wherein identifying one of a remaining number of other nodes comprises identifying one of the M nodes waiting for information transfer from the token-possessing node and having an associated highest priority counter of the waiting units.

23. The method according to claim 1, further comprising:
generating acknowledgment information in the identified node in response to receiving the token, wherein the acknowledgment information indicates success or failure of at least part of information transferred with the token.

24. The method according to claim 23, wherein identifying one of a remaining number of other nodes comprises identifying one of the M nodes associated with a highest priority counter waiting for transfer of the acknowledgment information from the token-possessing node.

25. The method according to claim 23, wherein identifying one of a remaining number of other nodes comprises identifying one of the M nodes waiting for information transfer from the token-possessing node and having an associated highest priority counter of the waiting units.

26. The method according to claim 23, wherein identifying one of a remaining number of other nodes comprises identifying one of the M nodes associated with a counter having a count value closest to a predetermined threshold value.

27. The method according to claim 23, wherein identifying one of a remaining number of other nodes comprises identifying one of the M nodes associated with a highest priority counter whose count value closest to a predetermined threshold value.

28. The method according to claim 1, wherein adjusting the count value of the counters comprises:

in each of the L nodes, adjusting the count value of the counter associated with the identified node by an amount based, at least in part, on the initial count value; and in each of the L nodes, incrementing or decrementing the count value of the M counters by a fixed amount.

29. The method according to claim 1, wherein step b) further comprises staggering the initial count values between at least two of the counters associated with the M nodes using an offset value.

30. A system for arbitrating access to a shared channel in a token-based communication network, comprising:
a shared channel medium; and
a number, N, of nodes, each of the N nodes capable of communicating with another one of the N nodes along the shared channel medium upon receiving a token, wherein each of a number, L, of the N nodes is associated with a token machine, $L \leq N$, and wherein each token machine comprises:
a number, M, of counters, wherein:
each of the M counters being associated with a corresponding one of a number, M, of the N nodes, and $M \leq L$; and
each of the M counters is assigned a priority level such that at least two of the M nodes have a different priority level; and
each of the M counters is associated with a respective initial count value; and
a processor for monitoring and controlling the M counters, wherein the processor is configured to select one of the N nodes to which the token is explicitly or implicitly transferred from a token-possessing another one of the N nodes.

31. The system according to claim 30, wherein the processor comprises logic configured to monitor a count value of each of the M counters and generate an address of one of the M nodes to which the token transferred based on the monitored count values.

32. The system according to claim 30, wherein M less than N.

33. The system according to claim 30, wherein at least one of the N nodes is a communication unit.

34. The system according to claim 31, wherein the logic is further configured to adjust the count value of each of its M counters after the token is passed.

35. The system according to claim 31, wherein the logic is further configured to generate the address based on the priority levels of the M counters.

36. The system according to claim 30, wherein the processor comprises logic configured to transfer the token at the start of a slot boundary of sequentially occurring time slots.

37. The system according to claim 36, wherein each of the processors is configured to adjust a count value of each its M counters during each of the sequentially occurring time slots.

38. The system according to claim 36, wherein at least one of the sequentially occurring slots is a priority slot associated with at least one of the N nodes and the processor logic is further configured to pass the token to a highest assigned priority one of the N nodes assigned a current one of the priority slots.

39. The system according to claim 30, wherein the N nodes are capable of using an ARQ scheme.

40. The system according to claim 30, wherein each controller is capable of adjusting a counter associated the selected node by an amount based, at least in part, on the selected node's initial value after the token is passed to the selected node.

41. A method of selecting one of a number, N, of communication devices for receipt of a token in a communication system that transmits during individual ones of a number of sequentially occurring transmission events, the method comprising:

assigning a corresponding priority level to each of the N communication devices, wherein at least two of the N communication devices are assigned different corresponding priority levels;

assigning a corresponding count parameter to each of the communication devices, including an own count parameter;

assigning a corresponding initial count value to each of the communication devices, including an own initial count value;

for each of the communication devices, initializing the corresponding count parameter to the corresponding initial count value;

for each successive transmission event, performing:
adjusting each of the count parameters;
determining whether a token has been received;
performing a first operation in response to determining that the token has been received; and
performing a second operation in response to determining that the token has not been received, wherein the first operation comprises:
readjusting the own count parameter;
selecting one of the N devices based, at least in part, on the count parameters; and
sending the token to the selected one of the N devices; and wherein the second operation comprises:
determining which of the N devices now has the token;
readjusting the count parameter of the device that now has the token.

* * * * *